No. 741,401. PATENTED OCT. 13, 1903.
H. HARRIS.
VEHICLE WHEEL RIM.
APPLICATION FILED MAR. 6, 1903.
NO MODEL.
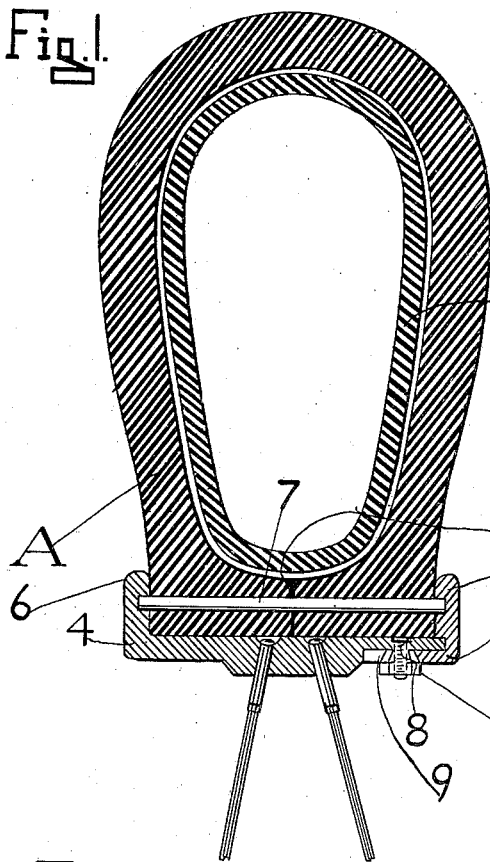
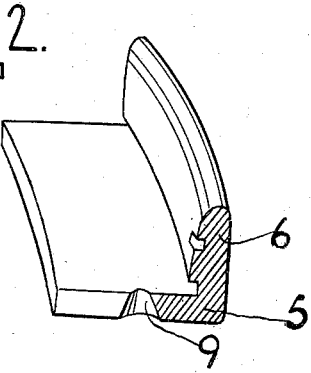
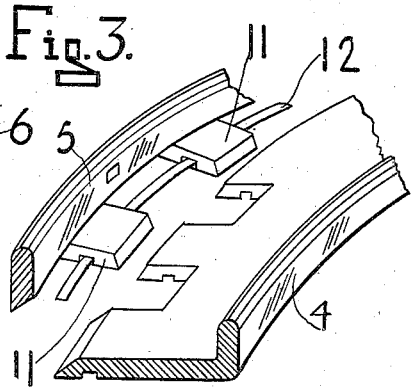
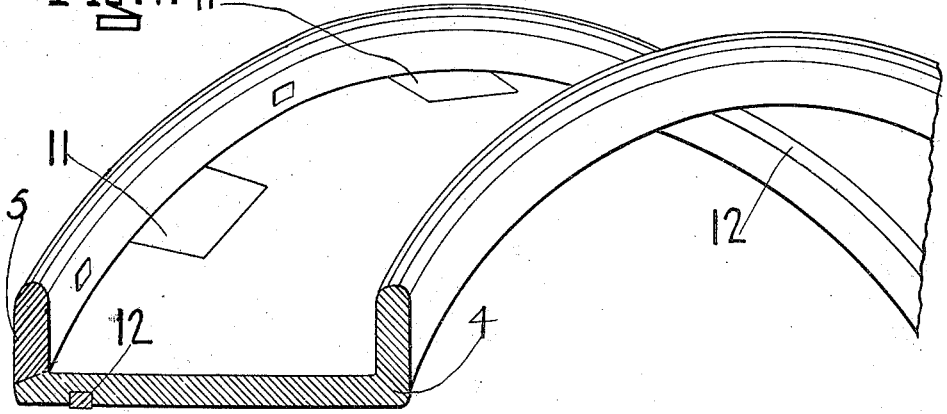
WITNESSES:
INVENTOR.
Howard Harris
BY Geo. H. Strong.
ATTORNEY.

No. 741,401. Patented October 13, 1903.

UNITED STATES PATENT OFFICE.

HOWARD HARRIS, OF SAN FRANCISCO, CALIFORNIA, ASSIGNOR OF ONE-HALF TO WM. J. GORHAM, OF SAN FRANCISCO, CALIFORNIA.

VEHICLE-WHEEL RIM.

SPECIFICATION forming part of Letters Patent No. 741,401, dated October 13, 1903.

Application filed March 6, 1903. Serial No. 146,503. (No model.)

*To all whom it may concern:*

Be it known that I, HOWARD HARRIS, a citizen of the United States, residing in the city and county of San Francisco, State of California, have invented an Improvement in Vehicle-Wheel Rims and Tires; and I hereby declare the following to be a full, clear, and exact description of the same.

My invention relates to improvements in vehicle-wheels employing inflatable tires, and pertains particularly to a form of sectional rim having means for quickly attaching and detaching the tire. Its object is to provide a rim and a double-tube tire therefor of simple construction and suitable for bicycles, automobiles, and other vehicles whereby in case of puncture or other needed repair the tire may be quickly and easily detached, the inner tube removed and mended, and the tire again replaced and locked in position securely on the rim.

It consists of the parts and the construction and combination of parts hereinafter more fully described, having reference to the accompanying drawings, in which—

Figure 1 is a transverse section through the rim and tire. Fig. 2 is an enlarged detail of the removable rim-section. Fig. 3 shows a modification of my rim with the parts separated. Fig. 4 shows the same parts united.

A represents the outer casing of a double-tube tire, having a continuous slit 2 on its inner side through which the inner tube 3 may be inserted.

The rim consists of two separable flanged sections 4 5, the one, 4, to which the spokes are secured, the other or supplemental section, 5, removable to allow of the tire being easily put on and off the rim. Flanges 6 are provided on the outer edges of each section, which flanges form lateral abutments for the tire to hold it in place.

Instead of the tire-seat on the rim being concaved, as in ordinary rims, it is flat, as shown, and the casing A accordingly has a flat bearing-surface on the rim, with square sides supported by the flanges 6.

The tire may be retained on the rim either by means of solid wire rings molded into the casing and encircling the rim after the manner of a certain well-known make of tire, or, as here shown, pins 7 may be passed transversely through the base of the casing and have their projecting ends seating in mortises in the inner side of flanges 6. Such a number of pins may be provided as are deemed necessary to hold the tire properly.

Any suitable means of attachment of the removable section 5 with stationary section 4 may be employed.

In Fig. 1 I have shown the base of section 5 channeled and the under side of section 4 along its unflanged edge correspondingly reduced to allow section 5 to be slipped over the edge of and be interlocked with section 4. The two parts are held rigidly together by means of bolts 8, seated at proper intervals in the reduced part of 4, engaging in slots 9 in section 5, and receiving conical-headed nuts 10, which are adapted to seat in corresponding recesses at the inner ends of the slots.

In Figs. 3 and 4 a second method of uniting the two sections is shown, in which the removable supplemental section 5 is provided with the lateral beveled projections 11, interlocking with corresponding projections on 4, and the parts held rigidly together by means of an expansible steel ring 12 engaging in notches in the under side of the interlocked projections.

In case of a puncture it is but the work of a moment to remove the key-ring 12 or to loosen nuts 10, so that section 5 may be taken off. As soon as the latter is separated from the spoke-section 4 the ends of pins 7 are released from their seats in flange 6, and the casing or any portion thereof may be slipped off to one side and opened along slit 2 to give access to the inner tube.

With heavy automobile-tires it has always been a matter of difficulty to remove the tire from the one-piece concaved rims, particularly where solid steel rings, as before mentioned, are used to hold the tire to the rim. With the present construction of a rim having a flat tire-seat the tire can be slipped off to one side without difficulty.

Having thus described my invention, what I claim, and desire to secure by Letters Patent, is—

1. The combination in a vehicle-wheel, of a rim comprising a flanged annular section secured to the spokes and a removable flanged section; means connecting the two sections, said sections having their flanges provided with mortises; a tire seating on the rim between the flanges of the sections; and pins passing transversely through the base of the tire and having their ends seating in the mortises of the flanges of the sections.

2. The combination in a vehicle-wheel, of a rim comprising two flanged sections one of said sections having lateral beveled-edge projections and the other section having corresponding projections and the projections of one section occupying the spaces between the projections of the other section, and an expansible ring engaging notches in the under sides of the interlocked projections.

In witness whereof I have hereunto set my hand.

HOWARD HARRIS.

Witnesses:
CHAS. E. NAYLOR,
S. M. DODSON, Jr.